United States Patent
Peirce, Jr.

[11] 3,891,188
[45] June 24, 1975

[54] TOOL FOR PULLING A LINE THROUGH A CONDUIT

[76] Inventor: Benjamin F. Peirce, Jr., 1040 S.W. 67th Ter., Plantation, Fla. 33317

[22] Filed: Feb. 25, 1974

[21] Appl. No.: 445,631

[52] U.S. Cl. ............................................. 254/134.3 R
[51] Int. Cl.² .............................................. E21C 29/16
[58] Field of Search ............ 254/134.3 R, 134.3 FT; 81/8.1; 294/19, 26; 15/104.02, 104.05, 104.16, 104.165

[56] References Cited
UNITED STATES PATENTS

| | | | |
|---|---|---|---|
| 373,289 | 11/1887 | Hart | 254/134.7 |
| 1,202,120 | 10/1916 | Stuckel | 294/26 |
| 1,858,176 | 5/1932 | Webb | 81/8.1 |
| 2,604,350 | 7/1952 | Taylor | 294/26 |
| 3,145,041 | 8/1964 | Grolig | 294/19 R |
| 3,162,475 | 12/1964 | Van Allen | 294/26 |
| 3,224,732 | 12/1965 | Williams | 254/134.3 FT |
| 3,330,533 | 7/1967 | Blume | 254/134.3 FT |

*Primary Examiner*—Othell M. Simpson
*Attorney, Agent, or Firm*—Oltman and Flynn

[57] ABSTRACT

A tool for pulling a line through a conduit including a bendable shank for entering the conduit, a handle at one end of the shank for manual manipulation, and a hook at the other end of a shank for catching a line in the conduit to be pulled through the conduit.

2 Claims, 3 Drawing Figures

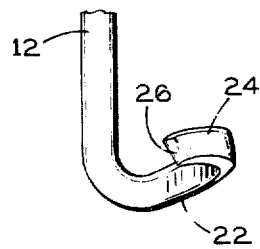
FIG. 2
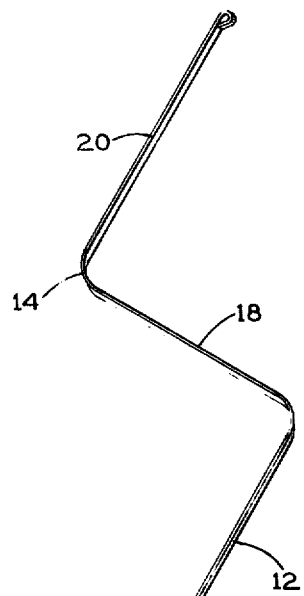
FIG. 1
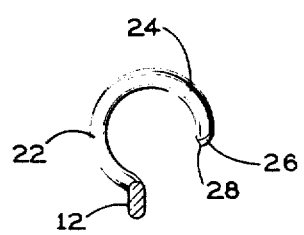
FIG. 3
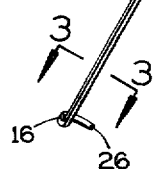

TOOL FOR PULLING A LINE THROUGH A CONDUIT

BACKGROUND OF THE INVENTION

In patent application Ser. No. 442,925 filed on Feb. 15, 1974, by the present inventor (Attorney's Docket No. 2377) a wiring arrangement is described and claimed in which a plurality of wires such as telephone wires extend through branch conduits and Y couplings into a main conduit or raceway which leads to a terminal normally located outside a building. In order to feed the wires through the branch conduits, a line, which is normally string, is fed through the main conduit and is then pulled up through each of the branch conduits. Wires are tied to the line at each of the branch conduits. Then the line is pulled from the terminal end of the main conduit in order to pull each of the branch wires through the branch conduits and the main conduit to the terminal. In order to carry out this wiring arrangement, it is necessary to have a tool for pulling the line from the main conduit up through the branch conduits so that the wires can be tied to the line. The present invention provides an advantageous tool for pulling the line through the conduits.

SUMMARY OF THE INVENTION

The present invention provides a tool for pulling a line through a conduit including an elongated bendable member having a long shank, a handle at one end of the shank to be grasped manually by a person and a hook at the other end of the shank for catching a line to be pulled through the conduit. The hook comprises first and second bights approximately normal to each other, with the first bight extending angularly in a plane from the shank to the second bight, and the second bight extending angularly from the plane of the first bight to a tip at which the second bight terminates.

Accordingly, it is an object of the present invention to provide a tool for catching a line in a conduit and for pulling the line through the conduit.

Another object of the invention is to provide a tool which can be manipulated to catch a line in a conduit merely by twisting the tool.

A further object of the invention is to provide a tool which can be inserted easily into a conduit through a bend in the conduit and which can be twisted easily in the conduit.

Another object of the invention is to provide a tool which will catch a line in a conduit without tangling the line.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a view of a tool in accordance with one embodiment of the invention;

FIG. 2 is a fragmentary view showing a hook at one end of the tool; and

FIG. 3 is a sectional view taken along line 3—3 of FIG. 1 and looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

The tool 10 includes an elongated, bendable shank 12 for entering a conduit. The tool 10 has a handle 14 at one end of the shank for manual manipulation. The tool 10 also has a hook 16 at the other end of the shank 12 for catching a line to be pulled through a conduit.

The tool is ordinarily made of wire or other strong but bendable material, and it is ordinarily made in one piece.

The handle 14 includes a portion 18 which is bent at a right angle relative to the shank 12, and another portion 20 which is bent at a right angle to portion 18. Handle portions 18 and 20 lie in the same plane as the shank 12.

The hook 16 includes a first bight 22 which bends in a curve substantially in the plane of the shank 12 through an angle of approximately 90°. The hook 16 also includes a second bight 24 which bends in a curve through at least 90° in a plane approximately at 90° to the first bight 22. The second bight 24 terminates in a tip 26 which tapers down in thickness to a terminal edge 28 that is rather sharp for facilitating twisting of the tool in a conduit so as to catch a line in the conduit. As may be seen in FIG. 2, the tip 26 is located slightly above the first bight 22 toward the handle 14.

In the use of the tool 10, the hook 16 is inserted first through a branch conduit which extends at approximately a right angle relative to a main conduit and enters the main conduit through a Y coupling. The tool is pushed into the branch conduit until the hook 16 enters the main conduit, and then is pushed a little further until the tool bends through the Y coupling and the hook 16 enters a substantial distance into the main conduit. As previously mentioned, the shank 12 is bendable to facilitate the insertion of the hook into the main conduit.

After the hook 16 is in the main conduit, the handle 14 is twisted so as to rotate the whole tool. The tip 26 follows around the inside circumference of the main conduit so that the bights 22 and 24 catch a line located in the conduit without tangling the line. The handle is then pulled so as to remove the hook 16 from the main conduit and then from the branch conduit. This pulls the line through the branch conduit until it emerges from the branch conduit. Once the line has been pulled out of the branch conduit, a wire can be tied to the line, and the line can then be pulled from one end of the main conduits so as to pull the wire through the branch conduit and the main conduit to a terminal box as previously described.

Having thus described my invention, I claim:

1. A tool for pulling a line through a conduit comprising an elongated wire having a long flexible shank, handle means at one end of said shank to be grasped manually by a person, and hook means at the other end of said shank comprising a first bight curving outward from said shank substantially in the plane of said shank through a turn of approximately 90°, and a second bight curving from said first bight through a turn of at least 90° and at a slight inclination back toward said one end of the shank in a plane approximately at 90° to said first named plane, said second bight terminating in a tip disposed toward said one end of the shank from said first bight, said tip having a tapered edge which merges smoothly with the outside circumference of said second bight and makes a distinct corner with the inside circumference of said second bight.

2. The tool as claimed in claim 1 in which said second bight curves through a turn of approximately 180°.

* * * * *